United States Patent [19]
Durand et al.

[11] Patent Number: 4,564,266
[45] Date of Patent: Jan. 14, 1986

[54] ELECTRO-OPTICAL DEVICES USING LIQUID CRYSTALS HAVING A TWIST IN A PLANE PERPENDICULAR TO SUBSTRATES

[75] Inventors: Georges E. A. Durand, Orsay; Philippe Martinot-Lagarde, Marcoussis; Ivan Dozov, Massy, all of France

[73] Assignee: Centre National de la Recherche Scientifique (CNRS), Paris, France

[21] Appl. No.: 487,186

[22] Filed: Apr. 21, 1983

[30] Foreign Application Priority Data

Apr. 28, 1982 [FR] France .................. 82 07309

[51] Int. Cl.⁴ .............................. G02F 1/13
[52] U.S. Cl. .................. 350/340; 350/346; 350/332
[58] Field of Search .......... 350/340, 346, 332

[56] References Cited

U.S. PATENT DOCUMENTS 4,114,990 9/1978 Mash et al. .............. 350/340 X
4,214,819 7/1980 Pohl et al. ............... 350/330 X

FOREIGN PATENT DOCUMENTS 117013 12/1975 Fed. Rep. of Germany .
52-29753 3/1977 Japan .................... 350/340

OTHER PUBLICATIONS

"Deformation of a Pretilted Nematic Liquid Crystal Layer in an Electric Field", K. Fahrenschon, H. Gruler & M. F. Schiekel, *Applied Physics*, vol. 11, pp. 67–74, 1976.

"Field-Induced Deformation of Hybrid-Aligned Nematic Liquid Crystals: New Multicolor Liquid Crystal Display", S. Matsumoto, M. Kawamoto & K. Mizunoya, *Journal of Applied Physics*, vol. 47, No. 9. pp. 3842–3845, Sep. 1976.

*Primary Examiner*—John K. Corbin
*Assistant Examiner*—Richard F. Gallivan
*Attorney, Agent, or Firm*—Christie, Parker & Hale

[57] ABSTRACT

An electro-optical method and apparatus uses liquid crystals. The method includes the step of filling a space between two parallel transparent plates with a material which comprises molecules having nematic properties, the structure of the molecules initially defining a substantially rectilinear nematic director perpendicular to the plates. A structure is then conferred on the material defining a second nematic director curved at least once in a plane perpendicular to the plate by application of a high frequency electrical field to the material, such that the second nematic director arrives substantially perpendicularly at at least one of the two plates. A twist is imparted to the second nematic director along a component at right angles to said plane perpendicular to the plates to impart a twist in the second nematic director. Light is caused to arrive with an incidence substantially at right angles to one of the plates to pass through the material, a rotation of polarization of the light, at an outlet from the plates, depending on the twist imparted to the second nematic director.

23 Claims, 6 Drawing Figures

FIG_1

FIG_2

FIG_3

FIG_4

ELECTRO-OPTICAL DEVICES USING LIQUID CRYSTALS HAVING A TWIST IN A PLANE PERPENDICULAR TO SUBSTRATES

BACKGROUND OF THE INVENTION

1. Field of the Invention

The present invention relates to certain new and useful improvements in or relating to electro-optical devices using liquid crystals.

The present invention relates to optical devices using liquid crystals and more particularly it relates to improvements to optical cells using liquid crystals in the nematic phase, which cause a rotation of the polarization of a light passing through them.

BRIEF DESCRIPTION OF RELATED ART

Generally, liquid crystals are constituted by organic substances which simultaneously have the characteristics of a liquid and those of a crystalline solid, such a state of matter, which is intermediate between solid and liquid, being referred to as "mesomorphic".

More precisely, liquid crystals in the nematic phase are classified into two major categories namely "calamitic" and "discotic".

Calamitic, nematic, liquid crystals are formed by elongated molecules whereof the major axes are all aligned in only one and the same direction. The centers of gravity of the molecules are distributed at random, as in an ordinary liquid and the molecules are able to move, all the movements of the molecules one with respect to the other or with respect to themselves being allowed on condition that the unidirectional alignment is preserved.

The result of this uniaxial orientation is that calamitic, nematic, liquid crystals always have positive optical anisotropy, positive diamagnetic anisotropy as well as dielectric anisotropy which is either positive or negative depending on the compound in question.

Discotic, nematic, liquid crystals are themselves formed by discs whereof the axes are all aligned in only one and the same direction. Here too, the centers of gravity of the molecules are distributed at random, as in an ordinary liquid and the molecules are able to move, all the movements of the molecules one with respect to the other or with respect to themselves being allowed on condition that the unidirectional alignment of the axes is preserved.

The result of this uniaxial orientation of the axes perpendicular to the plane of the discs is that discotic, nematic, liquid crystals have negative optical anisotropy, negative diamagnetic anisotropy as well as dielectric anisotropy which is either positive or negative depending on the compound in question.

Intensive research which has been carried out in recent years on nematic, liquid crystals and in particular on calamitic, nematic, liquid crystals, has revealed three major methods of electrical excitation for the latter: dynamic diffusion, alignment by an electrical field using the effect of controlled by-refringence and the helical nematic effect.

In the three cases, the basic optical cell is constituted by a layer of nematic liquid crystal enclosed between two parallel transparent plates of glass which are separated by several tens of microns, even several hundreds of microns and provided with transparent electrodes on their inner face, i.e. the face directed towards the layer of liquid crystal.

The following brief analysis of these three cases relates to layers of calamitic, nematic, liquid crystal.

When observing a cell of this type, it will be noted that in the absence of voltage applied between the electrodes, the liquid crystal is perfectly transparent, since it is orderly and thus invisible. On the other hand, the application of an electrical field by applying voltage to the said electrodes renders this medium highly diffusive and thus visible. The electrical field causes an imbalance of the molecular arrangement and intense turbulence and hence the diffusion of light.

The second method of excitation which consists of acting electrically on the birefringence of the product by controlling this action is based on a quite different principle from that of dynamic diffusion. When an alternating voltage with a frequency of the order of 5 kHz, greater than the frequency of relaxation of the charges of the liquid crystal, is applied between the said electrodes of the cell, on account of the dielectric anisotropy of the latter, a variation in the direction of alignment of the molecules occurs. At this point, it is appropriate to note that for nematic liquid crystals having positive dielectric anisotropy, since the dielectric constant in the direction of the axis of the molecules is greater than the dielectric constant perpendicular to this axis, the molecules have a tendency to become orientated parallel to the electrical field, whereas in the case of a liquid crystal having negative dielectric anisotropy, the molecules rather have a tendency to become orientated perpendicular to the electrical field. For this reason, in the presence of a liquid crystal having positive dielectric anisotropy, when filling the cell, it is advisable to ensure anchoring of the molecules parallel to the walls, whereas in the presence of a liquid crystal having negative dielectric anisotropy, it is necessary that the molecules are initially perpendicular to the plates. When the optical cell is then placed between a polarizer and an analyser and illuminated with white light, it can be seen that the transmission of the white light becomes highly chromatic and, by varying the voltage, it is possible to modify the apparent color of the cell.

In the third method of excitation, using the helical nematic effect, it is arranged that at the beginning the preferred directions of anchorage on the two plates, whilst being parallel to the plates, are not parallel to each other, so that one distorts the arrangement of molecules which form a helix. In order to do this, one initially defines a preferred direction of anchorage on each of the surfaces of the plates directed towards the liquid crystal, then with the anchorage on the walls being controlled in this way, one of the plates is made to pivot mechanically with respect to the other so that the two directions of anchorage form a given angle preferably equal to 90° between them, the structure of the material then defining a uniform helical arrangement. On account of the anisotropy of the molecules, the latter is able to rotate through 90° the plane of polarization of the light which passes therethrough. On the other hand, as soon as the helix is destroyed, by orientating the molecules perpendicular to the plates, by the application of a voltage of several volts to the terminals of the cell, any rotation of the plane of polarization of the light is eliminated. Consequently, if in this case also, the cell is placed between a polarizer and an analyzer, according to the relative position of the latter, (crossed or otherwise) and the state of the cell (application of an electrical field or otherwise) it is possible to allow the passage of light or otherwise. Since the matrix-like control is possible, it is possible to use this phenomenon in order to produce screens comprising a plurality of characters. However, since each of the basic cells changes from one state to another and consequently operates virtually in an "on or off manner", it will be understood that the applications of the helical nematic effect are limited.

It is apparent from the preceding analysis that the methods of use previously proposed for devices comprising liquid crystals are both complex and difficult to perform and control. In particular, it should be noted that in the vast majority of cases, the effects obtained by virtue of the said previous methods on the one hand are not linear depending on the control applied, on the other hand they have thresholds. For all these reasons, the use of liquid crystals in the field of industry has remained very restricted. In fact, the use of liquid crystals is virtually limited to the area of display, in particular for portable appliances, an area in which liquid crystal displays have become serious competitors for displays using electroluminescent diodes, in particular on account of the low levels of voltage and current which they require, which for example makes it possible to increase the life of the batteries very substantially and to produce a permanent display.

SUMMARY OF THE INVENTION

The present invention now proposes a new electro-optical method using liquid crystals, according to which (a) one places a material which comprises molecules having nematic properties between two parallel transparent plates, the said method being characterised in particular by the fact that it also comprises the following stages: (b) conferring on said material a structure defining a nematic director curved at least once in a plane perpendicular to said plates, such that the nematic director arrives substantially perpendicular to at least one of the two plates, (c) causing twisting of the nematic director along a component at right angles to said plane perpendicular to the plates and (d) passing light arriving with an incidence substantially perpendicular to one of the plates, through the material, the rotation of the polarization of the light, at the outlet, being dependent on the twist imposed on the nematic director.

The unitary vector representative of the preferred direction of alignment of the molecules is referred to as the nematic director.

As will become apparent from reading the ensuing description, the method according to the present invention has numerous advantages with respect to previously existing methods. One of the main advantages is due to the fact that this method makes it possible to ensure with ease a continuous and linear variation of the polarization of light passing through the cell whereas in the case of the helical nematic effect, the control was not continuous but operated in "an on/off manner". On the other hand, it should be noted that since the nematic director arrives perpendicular to at least one of the plates, it is sufficient to choose the latter as the outlet plate of the cell in order to make the polarization of the light leaving the cell, totally non-dependent on the orientation of molecules on the latter. A feature of this type could in no way be obtained in the case of a helical nematic effect.

According to a first variation for carrying out the invention, the stage (b) comprises the application of a surface treatment to at least one of the surfaces of the plates directed towards said material and preferably the surface treatment comprises the application of a coating to at least one of the surfaces of the plates orientated towards the material.

More precisely, according to a preferred variation for carrying out the present invention, the coating is formed by polyvinyl alcohol on one of the plates and silane on the other, in order to determine an orientation of the nematic director which is planar on one plate and perpendicular on the other.

According to another variation for carrying out the invention, the stage (a) comprises the filling of the space defined between the two plates by a material which comprises molecules having nematic properties, the structure of which initially defines a substantially rectilinear, nematic director perpendicular to the plates and the stage (b) comprises the application of a high frequency electrical field to the material.

By high frequency electrical field, we mean an oscillating electrical field whereof the period is less than the relaxation time of the charges of the material. In contrast, by low frequency electrical field we mean an oscillating electrical field whereof the period is greater than the relaxation time of the charges.

More precisely, when said material has negative dielectric anisotropy, the high frequency electrical field is applied substantially perpendicular to the plates, whereas when said material has positive dielectric anisotropy, the high frequency electrical field is applied substantially parallel to the plates.

According to a third variation for carrying out the invention, the stage (a) comprises the filling of the space defined between the two plates by a material which comprises molecules having nematic properties, whereof the structure initially defines a substantially rectilinear nematic director perpendicular to the plates and the stage (b) comprises the application to the material of a magnetic field of orientation parallel to the plates for calamitic, nematic, liquid crystals and perpendicular to the plates for discotic, nematic, liquid crystals.

According to a first variation for carrying out the invention, the stage (c) comprises the application to the material of a continuous or low frequency electrical field having a component at right angles to said plane perpendicular to the plates.

According to a variation for carrying out the present invention, the stage (c) also comprises the application to the material of a high frequency electrical field of orientation substantially parallel to the plates, said high frequency electrical field being at right angles to said plane perpendicular to the plates, when the material has positive dielectric anisotropy, whereas the high frequency electrical field is parallel to the plane perpendicular to the plates when the material has negative dielectric anisotropy.

According to another variation for carrying out the present invention, the stage (c) also comprises the application to the material of a magnetic field substantially parallel to the plates and more precisely of a magnetic field at right angles to said plane perpendicular to the plates for calamitic, nematic, liquid crystals and parallel to said plane perpendicular to the plates for discotic, nematic, liquid crystals.

According to another variation for carrying out the invention, the stage (c) of the method comprises the introduction into the cell of a material comprising molecules having cholesteric properties.

The liquid crystals in cholesteric phase are constituted by elongated molecules, organized in layers.

The molecules are parallel to each other inside the same layer, but furthermore the different layers do not have an indifferent position with respect to each other, the axes of orientation of the molecules in the various layers being organized according to a helicoidal structure.

In order to give preference to a particular area of the structure, the stage (b) of the method may also comprise the application to the material of an oblique magnetic field with respect to said plates and more precisely of orientation situated in said plane perpendicular to the plates, defined by the nematic director, in the case of calamitic nematics.

According to one variation, one can give preference to a particular area of the structure of said material by the application to the cell of an oblique electrical field with respect to said plates.

The electro-optical device comprising liquid crystals according to the present invention is of the type comprising a cell which is composed of two parallel transparent plates between which is placed a material which comprises molecules having nematic properties and means able to interact with at least part of the molecules and the device is characterised, in particular, by the fact that it comprises orientation means arranged in order to confer on said material contained between the plates, a structure defining a nematic director curved at least once in a plane perpendicular to the said transparent and parallel plates, such that the nematic director arrives perpendicularly at at least one of the two plates, as well as twisting means able to cause twisting of the nematic director along a component at right angles to said plane perpendicular to the plates defined by the nematic director under the action of the orientation means.

According to a first variation of construction, the orientation means comprise a surface treatment on at least one face of the plates directed towards said material.

More precisely, the orientation means comprise a coating deposited on at least one face of the plate directed towards said material. Even more precisely, according to a preferred embodiment, said coatings are constituted by polyvinyl alcohol on one of the plates and silane on the other.

According to a second variation of construction, the orientation means comprise means able to apply an electrical field to the optical cell.

According to a third variation of construction, the orientation means comprise means able to apply a magnetic field to the cell.

According to a first variation of construction of the twisting means, the latter comprise means able to apply a continuous or low frequency electrical field to the cell, parallel to the plates.

The twisting means may also comprise means able to apply a high frequency electrical field or a magnetic field, parallel to the plates of the cell.

According to a second embodiment of the twisting means, the latter comprise a material comprising molecules having cholesteric properties, mixed with the material comprising molecules having nematic properties.

The device also comprises means sensitive to the polarization of light which enters the cell and means for examining variations of the polarization of light passing through the cell.

BRIEF DESCRIPTION OF THE DRAWINGS

Other features and advantages of the present invention will become apparent on reading the ensuing detailed description and with reference to the accompanying drawings given as non-limiting examples, which should be considered as incorporated in the description by the reference which is made to them in the latter and in which.

DETAILED DESCRIPTION OF THE PREFERRED EMBODIMENTS

The ensuing detailed description relates more particularly to calamitic, nematic, liquid crystals.

Figure 1:
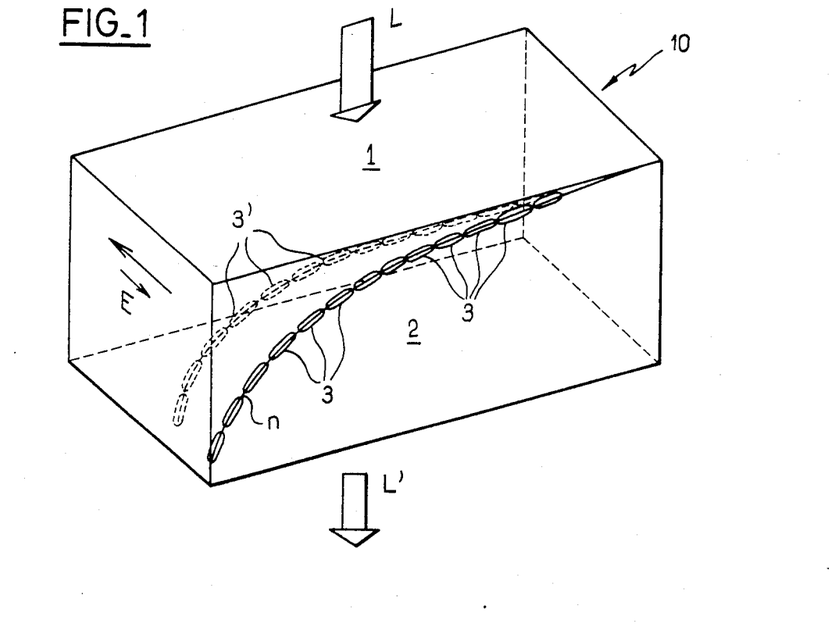
FIG. 1 is a diagrammatic perspective view of an optical cell comprising liquid crystals according to the present invention.

As shown diagrammatically in FIG. 1, the basic optical cell 10 is composed in a conventional manner of two parallel, transparent plates 1 and 2, for example of glass, inserted between which is a material comprising molecules having nematic properties. The material in the form of elongated molecules bearing the reference numeral 3 is shown diagrammatically in FIG. 1. Naturally, all the space situated between the plates 1 and 2 should be filled, but in order to simplify the illustration, only one single alignment of molecules 3 has been reproduced, the dimensions of which are not in proportion to the dimensions of the cell.

Naturally, said material 3 is retained between the two plates 1 and 2 of the cell 10 by an annular member (not shown in FIG. 1) which also acts as a spacing member. Preferably, this annular member will be made from an electrically insulating material.

Figure 2:
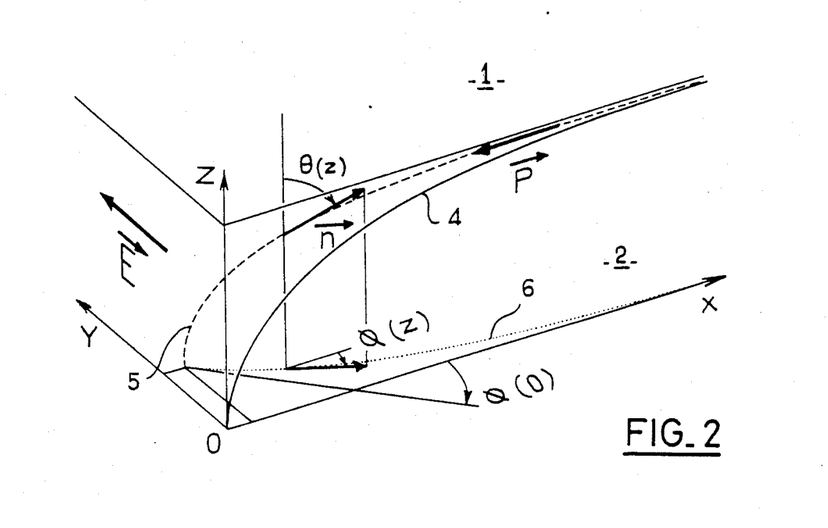
FIG. 2 is a partial diagrammatic perspective view of an optical cell comprising liquid crystals according to the present invention and illustrates a basic concept of the latter.

For a good understanding of the remainder of the present description, an orthonormal datum line will now be defined, as shown in FIG. 2, the origin of which bears the reference 0 and is situated on the plate 2 and the axes 0x and 0y are at right angles to each other and parallel to the plates 1 and 2, whereas the axis 0z is perpendicular to the latter.

The cell 10 also comprises so called orientation means (not shown in FIGS. 1 and 2 and which will be described in further detail in the ensuing description) which are able to confer on the material a structure defining a nematic director n curved at least once in a plane perpendicular to the plates 1 and 2 (under the circumstances the plane x0z), such that the nematic director n arrives substantially perpendicularly at at least one of the two plates, namely the plate 2 according to the embodiment shown in FIGS. 1 and 2. As has been mentioned previously, the unitary vector representative of the preferred direction of alignment of the molecules is referred to as the nematic director n. One preferably provides strong anchorage to the walls of the cell.

$\theta(z)$ and $\phi(z)$ refer to the angles formed on the one hand between the nematic director n and the axis 0z perpendicular to the plates 1 and 2 and on the other hand between the projection of the nematic director n on the plane x0y and the direction of alignment of the molecules on the plate 1, namely the axis 0x.

The cell 10 also comprises so called twisting means (which will be described in more detail in the following description) able to cause twisting of the nematic director n along a component at right angles to said plane x0z perpendicular to the plates 1 and 2, which plane x0z is defined by the nematic director n under the action of the orientation means. Under the circumstances, since the said plane perpendicular to the plates 1 and 2 coincides with the plane x0z, the twisting means tend to twist the nematic director n along the axis 0y. The position of the molecules at the time of the application of said twisting means is shown diagrammatically in broken line in FIG. 1 by the reference 3'.

Thus, if one directs towards a so called inlet face (plate 1) of the cell 10 formed in this way and at an incidence at right angles to this inlet plate, light (shown diagrammatically in FIG. 1 by the arrow bearing the reference L) polarized in a linear manner, whereof the plane of polarization corresponds to the alignment of the molecules situated in the vicinity of the inlet plate 1, the Applicant has observed that the plane of polarization of the light L' which passes through the cell 10 rotates through an angle $\phi o$ equal to the twist imposed by said twisting means on the nematic director n.

The rotation of the plane of polarization of the light L is due to the optical wave-guide effect produced by the molecules making up the material 3 enclosed between the two plates 1 and 2.

By modifying the action of the twisting means, the angle of rotation ($\phi o$) of the polarization of light L is modulated directly.

The embodiment illustrated diagrammatically in FIG. 1 will now be described in more detail.

According to the embodiment illustrated in FIG. 1, the orientation means comprise surface treatments consisting of applying coatings to at least one of the faces of plates 1 and 2 directed towards said material.

According to a particular embodiment, the coatings are formed from polyvinyl alcohol on one of the plates 1 and silane on the other 2. As shown in FIG. 1, coatings of this type define an orientation of the molecules and thus of nematic director (n), which is planar on the first plate (1), i.e. parallel to the latter and homeotropic on the second (2), i.e. perpendicular to the latter.

Naturally, numerous methods of carrying out the surface treatments could be retained, the nature of the aforesaid coatings being given solely as a non-limiting example. Similarly, the surface treatment may be carried out not in the form of a coating on at least one of the surfaces of the plates 1 and 2, but by previous rubbing of the latter, even of the electrodes covering them, as will be described in more detail hereafter, for example by means of a fine paper tissue. The purpose of rubbing of this type, which may be carried out on a previous coating, is to determine the preferred direction of alignment of the molecules (under the circumstances along the axis Ox).

The result of the "mechanical" distortion imposed in the layer of nematic liquid crystal (3) by the surface treatment, at the time of filling of the cell, is a curvature of the nematic director n in a plane (xOz) perpendicular to the plates 1 and 2. The curvature of the nematic director n has been shown diagrammatically by the full line bearing the reference numeral 4 in FIG. 2. This curvature of the nematic director n induces a polarization of flexoelectric volume P. This phenomenon was discovered by R. B. MEYER and described in the publication Phys. Rev. Lett. 22 (1969) 918.

In fact, we now know that the flexoelectric constant e is of electrical quadrupolar origin. By retaining solely the volume effect, which is not restored to the surface, one demonstrates that the polarization of flexoelectric volume P, proportional to e*/d is parallel to the axis Ox, i.e. to the said plane (xOz) perpendicular to the plates 1 and 2 and localized in the vicinity of the plate 1 as shown diagrammatically by the arrow bearing the reference mark $\vec{P}$ in FIG. 1.

d is defined as being the distance between the two parallel plates 1 and 2 and e* the "anisotropic" component of the flexoelectric constant, $e^* = e_1 - e_3$ in which $e_1$ represents the component of the flexoelectric constant due to the divergence and $e_3$ represents the component of the flexoelectric constant e due to the curvature proper.

In fact $\vec{P} = e^* \vec{n} \, div \, \vec{n}$.

Thus, if one applies by means of two parallel electrodes, not shown in FIG. 1, but which may be compared with the front wall and the rear wall of the cell 10, parallel to the plane xOz, a continuous or low frequency electrical field E orientated along the axis Oy, parallel to the plates and perpendicular to the direction of the vector $\vec{P}$ representing the polarization of flexoelectric volume, a torque proportional to the electrical field E applied is created, which comes into equilibrium with an elastic torque proportional to $$\frac{K}{d^2} \phi o,$$

in which K is the constant of curvature of the material, $\phi o$ is the azimuthal angle of maximum twisting and d the distance between the two plates, one thus observes constant twisting of the structure of the material 3 with respect to the direction of alignment on the plate 1, which is shown diagrammatically in broken line in FIG. 1. An electrical field whereof the period is greater than the relaxation time of the charges is referred to as a low frequency electrical field. More precisely, the azimuthal angle of maximum twisting $\phi o$ corresponds to the angle $\phi(z)$ existing between the axis Ox (orientation of the molecules on the plate 1) and the tangent line between the plane xOy to the projection, on this same plane, of the nematic director defined by the molecules close to the plate 2. In a state of equilibrium, one obtains an angle $\phi o$ directly proportional to the value of the electrical field E applied. In other words, the angle $\phi o$ is linear in the field E.

The orientation of the nematic director n obtained subsequent to the application of the electrical field E has been shown diagrammatically in FIG. 2 in the form of a broken line bearing the reference numeral 5. The projection of the latter on the plane xOy is represented by a dotted line bearing in reference numeral 6.

In fact, if one considers that the angle $$\theta \left( \theta = \frac{\pi z}{2d} \right)$$

is not modified by the application of the electrical field E along the axis Oy, one demonstrates that:

$$\phi o = \frac{-e^* E d}{\pi k}.$$

In such a case, the wave-guide behaviour imposing that $\Delta np$ is greater than $\lambda$ (in which $\Delta n$ represents the apparent birefringence of the nematic liquid crystal, p represents the pitch of the twisted structure and $\lambda$ the wave length of the light passing through the cell) i.e. $\theta$ is greater than $$\frac{\lambda e^* E}{3k}$$

which is of the order of $$\frac{\lambda}{d} \phi o,$$

the relative error on the value $\phi o$ is of the order of $$\frac{\lambda^2}{d^2} \phi o.$$

As will be explained in more detail in the following description, with linear behavior, $\phi o$ will always be less than a radian, consequently a cell 10 having a thickness d greater than the wave length $\lambda$ of the light passing through it, may be compared with an element behaving as an optical wave guide over its entire thickness and one can consider that the plane of polarization of the light passing through the cell undergoes a rotation by an angle $\phi o$.

If one directs towards the face 1 of the cell formed in this way and at an incidence at right angles to this plate 1, light L polarized in a linear manner, the plane of polarization of which corresponds to the direction of alignment of the molecules 3' on this plate 1, it will be found that the polarized light L' leaves the face 2 after having turned through the angle $\phi o$.

Figure 3:
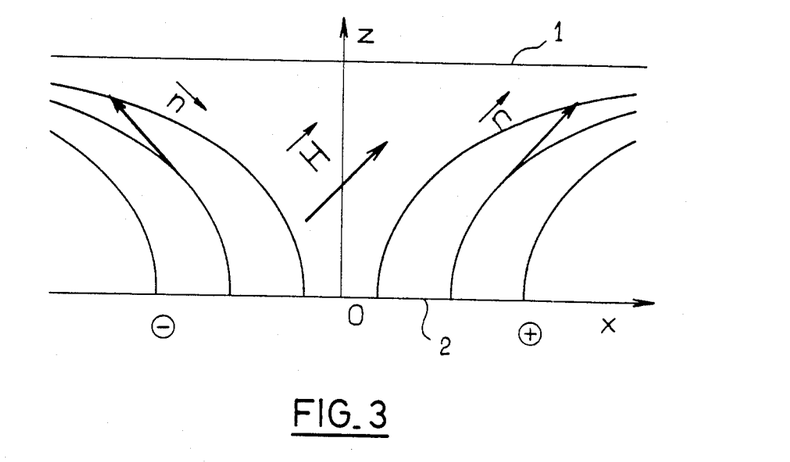
FIG. 3 is a diagrammatic sectional view of an optical cell comprising liquid crystals according to the present invention, along a section plane perpendicular to the plates and more precisely illustrates the stage consisting of giving preference to a particular area of the molecular arrangement.

As shown diagrammatically in FIG. 3, which is a sectional view of the cell, along a section plane parallel to the plane xOz, when the nematic liquid crystal (3) is introduced inside the space defined between the two plates 1 and 2, the latter having previously undergone the appropriate treatments, the structure of the material may define two areas (shown on either side of the axis Oz in FIG. 3 and marked with the references + and −) whereof the nematic directors n̄ are curved in the same plane (xOz) perpendicular to the plates 1 and 2, but in opposite directions.

In order to make the structure of the material 3 enclosed between the two plates 1 and 2 uniform, it is advisable to give preference to one of the said areas. This may be achieved simply by the application, even provisional, of a magnetic field H, shown diagrammatically in FIG. 2, which is oblique with respect to the said plates 1 and 2, whereof the orientation is situated in said plane (xOz) perpendicular to the plates 1 and 2. In fact one knows that the molecules for calamitic, nematic, liquid crystals have a tendency to become aligned parallel to the lines of the magnetic field. Under the circumstances, according to the embodiment illustrated in FIG. 3 the area (+) shown to the right of the axis Oz will tend to increase, whereas the area (−) of opposite curvature, shown in the left of the axis Oz will tend to disappear, on account of the application of the aforesaid magnetic field H.

In a similar manner, it is possible to give preference to one of the areas (+ or −) by applying an electrical field to the cell 10. The direction of the electrical field must be determined in accordance with the sign of the dielectric anisotropy of the material (3). In fact, as has already been mentioned, in the case of a liquid crystal having positive dielectric anisotropy, the molecules have a tendency to become orientated parallel to the electrical field, whereas in the case of a liquid crystal having negative dielectric anisotropy, the molecules rather have a tendency to become orientated perpendicular to the electrical field.

A particular example of using a cell 10 according to the embodiment illustrated in FIG. 1 will now be described.

EXAMPLE 1

A first test was carried out on an optical cell filled with a nematic liquid crystal under the following conditions:

Nature of the liquid crystal (3): MBBA (METOXYBENZYLIDENE BUTYLANILINE), the glass plates 1 and 2 are covered respectively with a film of polyvinyl alcohol (plate 1) and silane (plate 2), distance between the two glass plates: 40 μm, one area of the structure has been given preference by the application of an oblique magnetic field to the plates, ambient temperature: 20° C.

When the cell filled in this way was inserted between a polarizer (adjacent the plate 1) which polarizes the light L in the direction of alignment of the molecules on the plate 1 and an analyzer (adjacent the plate 2), one observed a rotation of the plane of polarization of the light L' leaving the cell 10, which is linear depending on the electrical field E applied to the latter along the axis Oy, by means of two electrodes not illustrated in FIG. 1. For an angle of rotation of ±30°, the electrical field E was of the order of ±50 V/mm.

The polarizer and analyzer have not been shown in the drawings.

With the polarizer located adjacent the plate 1 on which the orientation of the molecules 3' is fixed, it will be understood that it is sufficient to pivot the analyzer in order to observe the variations of rotation of the plane of polarization of the light L' which has passed through the cell. On the other hand, since the nematic director n arrives perpendicular to the plate 2, the orientation of the molecules on this plate does not interfere with the orientation of the plane of polarization of the light leaving the cell.

Figure 4:
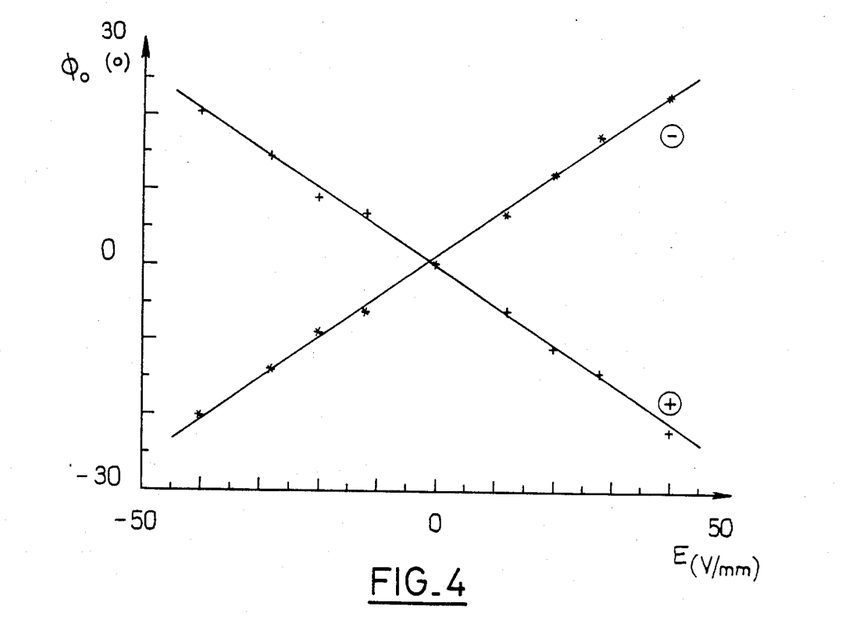
FIG. 4 illustrates a curve representative of the amplitude of the angle $\phi_0$ of rotation of the plane of polarization read on a cell according to FIG. 1, depending on the amplitude of the electrical field E applied.

As illustrated in FIG. 4, which shows the variation of the angle of rotation φo of the plane of polarization of the light (recorded on the Y-axis) depending on the electrical field E applied to the cell (recorded on the X-axis), for a given area, when one reverses the direction of the electrical field E, one reverses the direction of rotation. Similarly, when one reverses the curvature of the nematic director n of the structure, i.e. when one passes from a first area (+) to a second area (−) of opposed curvature, due to the application of an oblique magnetic field to the plates and which is at right angles to the magnetic field generated in order to give preference to the first area, as shown in FIG. 4, one observes that the curves drawn on each of the two areas are absolutely symmetrical.

On account of a cell 10 of this type, one can consequently easily produce a system for controlling the rotation of the polarization of a light L which passes through it and thus modulates the intensity of the light beam when the cell 20 is located between a polarizer and an analyzer. It should be noted that the effect has no threshold.

The luminous intensity of the beam passing through the cell will be maximum when the material causes the plane of polarization to rotate so that the latter is parallel to the direction of the analyzer, on leaving and on the other hand minimal (even zero if the sample of liquid crystal is perfect) if the plane of polarization is inclined by 45° with respect to the analyzer, on leaving.

The tests carried out have shown that it is easily possible to obtain a rotation of the plane of polarization of the light between −45° and +45°, even −50° and +50°. When one attempts to exceed these values by the application of an electrical field of high amplitude, one observes the appearance of electrohydrodynamic instabilities, the effects at $E^2$ thus become preponderant.

The response time $\tau$ of the cell is typically that of a nematic liquid crystal, i.e. of the order of 100 ms in the case of the above mentioned cell. The response time $\tau$ is proportional to $$\frac{d^2\eta}{K}$$

in which $\eta$ represents the viscosity of the liquid crystal.

The Applicant has also observed that the maximum angle (φo) of rotation of the plane of polarization tended to rise when one increased d. Such an increase in the thickness of the cell naturally tends to raise the response time of the cell 10, however it is possible to reduce the latter by the application of stabilizing fields.

EXAMPLE 2

Figure 5:
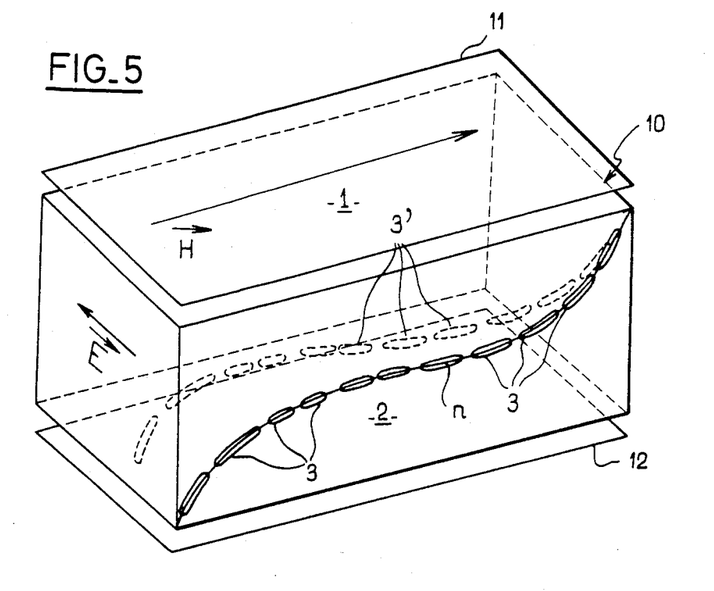
FIG. 5 is a diagrammatic perspective view of an optical cell comprising liquid crystals according to the present invention and more precisely illustrates a variation of the structure conferred on the material by stage (b) of the method.

A second test was carried out on an optical cell 10 filled with a nematic liquid crystal, under the following conditions:

Nature of the liquid crystal MBBA (METOXYBENZYLIDENE BUTYLANILINE),
distance between the two glass plates: of the order of 40 μm,
the structure of the liquid crystal initially defines a rectilinear nematic director perpendicular to the plates,
by application of a magnetic field of orientation parallel to the plates, one confers (stage b) on the material (3) a structure defining a nematic director n having a double curve in a plane perpendicular to the plates (plane bearing the reference xOz), such that the nematic director n arrives perpendicular to the plates 1 and 2 and is substantially parallel to the latter at the center of the layer of liquid crystal, as shown in FIG. 5.

The intensity of the magnetic field must be determined according to each particular case and in particular according to the nature of the liquid crystal used and the distance d existing between the two plates 1 and 2. Naturally, the higher the intensity of the magnetic field, the more pronounced the curvature of the nematic director n, since the molecules of the liquid crystal tend to become orientated parallel to the field H. However, the Applicant has found that if the intensity of the magnetic field is too high, the latter makes the structure of the material rigid, it is then difficult to carry out twisting of this structure during stage c of the method. In this case also, it is possible to give preference to a particular area of the structure by the application of an appropriate magnetic or electrical field.

In addition, the cell 10 filled in this way is introduced between a polarizer and an analyzer shown diagrammatically at 11 and 12. When inoperative, i.e. in the absence of an electrical field E at right angles to the plane xOz perpendicular to the plates 1 and 2 containing the nematic director n of the structure, the plane of polarization of the light passing through the cell is not modified. Thus, if the polarizer 11 and the analyzer 12 have a parallel orientation and are parallel or perpendicular to the said plane xOz perpendicular to the plates 1 and 2, imposed by the magnetic field H, the cell is transparent and allows light to pass without rotation of the polarization.

On the other hand, during the application of a continuous or low frequency electrical field E parallel to the plates and more precisely perpendicular to the plane xOz, similar to the field E shown in FIGS. 1 and 2, one causes rotation of the polarization of light due to the torque EP which comes into equilibrium with an elastic torque and which tends to cause twisting of the nematic director n along a component at right angles to the said plane xOz perpendicular to the plates 1 and 2. A portion of a helix is thus created at the center of the sample.

The rotation of the plane of polarization observed is thus twice that observed in the case of example 1.

In order to allow the maximum amount of light to pass through the cell 10, it is thus necessary to rotate the polarizer 11 through an angle +φ and the analyzer 12 through an angle −φ with respect to the plane xOz perpendicular to the plates 1 and 2 defined by the magnetic field H.

The cell described in example 2 may be used to produce a light modulator or a polarization rotator.

According to a variation for carrying out this example 2, the magnetic field parallel to the plates 1 and 2 which confers on the material 3 a structure defining a nematic director n having a double curve in a plane xOz perpendicular to the plates may be replaced by a high frequency electrical field, that is to say with a period less than the relaxation time of the charges, so that the space charges do not have time to appear. As an example, the frequency of the high frequency electrical field could be of the order of 1 kHz.

In the case where the cell 10 is filled with a liquid crystal having negative dielectric anisotropy, such as MBBA, the high frequency electrical field should be perpendicular to the plates 1 and 2. Thus, starting with a structure which defines a nematic director n perpendicular to the plates 1 and 2, one observes that with a high frequency electrical field perpendicular to the plates 1 and 2, the molecules 3 located at the center of the layer tend to bend in order to be orientated perpendicular to the electrical field, thus parallel to the plates 1 and 2 and thus to define a nematic director n having a double curve in a plane xOz perpendicular to the plates 1 and 2.

On the other hand, in the case where the cell 10 is filled with a liquid crystal having positive dielectric anisotropy, since the molecules tend to become orientated parallel to the electrical field applied, it is necessary to orientate the high frequency electrical field parallel to the plates 1 and 2 and to the plane xOz chosen, so that the structure defines a nematic director n having a double curve in a plane xOz perpendicular to the plates 1 and 2.

Naturally, the means able to apply either a magnetic field or an electrical field should not mask the light beam.

In particular, when one uses a liquid crystal having negative dielectric anisotropy, it is necessary for the electrodes located on each of the plates 1 and 2, either to have relatively small dimensions, or to make the latter transparent thus, according to a relatively conventional technique within the art, it is possible to make the electrodes transparent by means of a conducting layer of zinc oxide, tin oxide or indium oxide.

In the preceding description, stage (c) of the method according to the present invention consists of applying to the nematic liquid crystal a continuous or low frequency electrical field E parallel to the plates 1 and 2 in order to cause twisting of the nematic director n along a component at right angles to said plane xOz perpendicular to the plates 1 and 2.

Other variations of carrying out stage (c) of this method will now be described.

EXAMPLE 3

Figure 6:
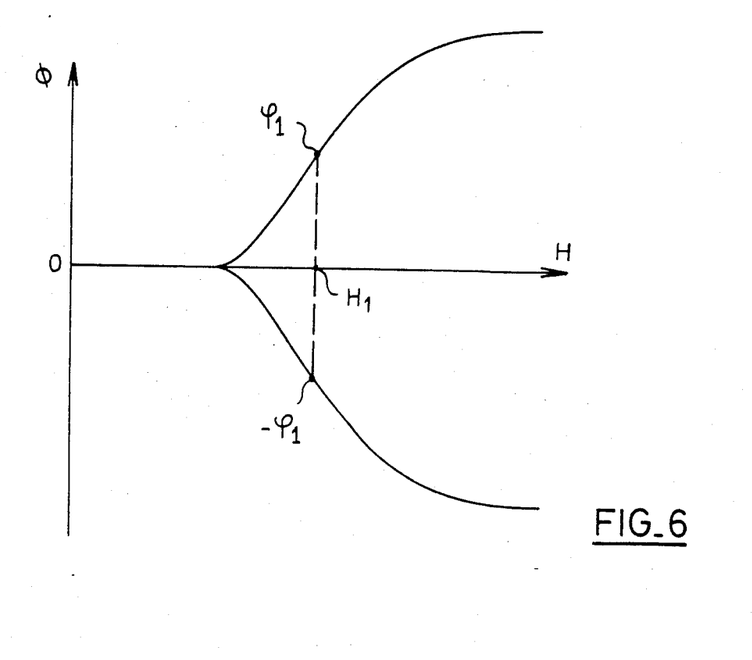
FIG. 6 shows a curve representative of the amplitude of the angle of rotation $\phi$ read in the case of a variation for carrying out the method.

Tests have been carried out on an optical cell 10 according to cell defined in example 2. However, instead of applying to the latter a continuous or low frequency electrical field E at right angles to said plane xOz perpendicular to the plates 1 and 2, defined by the nematic director n, one initially applies a magnetic field of the same orientation. As shown diagrammatically in FIG. 6, one thus observes a rotation of the plane of polarization of the light passing through the cell perpendicular to the plates, the amplitude of which rotation depends on the amplitude of the magnetic field applied. The phenomenon is not linear and has a threshold. FIG. 6 shows the angle of rotation of the plane of polarization $\phi$ on the Y-axis and the amplitude of the magnetic field H on the X-axis.

The rotation of the plane of polarization may be directed from one side or the other, by chance, which explains the presence of a threshold.

However, it is possible to give preference to one direction by applying initially to the cell 10 a continuous or low frequency electrical field E, at right angles to said plane xOz perpendicular to the plates 1 and 2. The amplitude of the continuous or low frequency electrical field E may be relatively low, since the flexoelectric effect observed within examples 1 and 2 does not have a threshold.

In a similar manner, if for a magnetic field of amplitude $H_1$, the angle of rotation of the plane of polarization of light passing through the cell is equal to $\phi_1$, the direction of $\phi_1$ additionally being defined by the application of a continuous or low frequency electrical field E, of appropriate direction, by the application of a continuous or low frequency electrical field E of opposed direction, having a sufficient amplitude, it is possible to reverse the direction of the angle of rotation and pass from $+\phi_1$ to $-\phi_1$ and so on.

In other words, one obtains a bistable effect whereof the control is constituted by the application of a continuous or low frequency electrical field E of appropriate amplitude and direction.

This property may be used for switching a light modulator or a polarization rotator between two predetermined positions.

Naturally, the orientation of the aforesaid magnetic field in independent of the direction of dielectric anisotropy of the nematic liquid crystal used.

According to another variation for carrying out the method according to the present invention, the magnetic field intended to cause twisting of the nematic director n along a component at right angles to the plane xOz perpendicular to the plates 1 and 2, may be replaced by a high frequency electrical field parallel to the plates 1 and 2.

In the case of a liquid crystal having positive dielectric anisotropy, the high frequency electrical field should be orientated parallel to the aforesaid continuous or low frequency electrical field, i.e. at right angles to said plane xOz perpendicular to the plates 1 and 2, since the molecules thus have a tendency to become orientated parallel to the electrical field.

On the other hand, in the case of a liquid crystal having negative dielectric anisotropy, in theory, the high frequency electrical field should be orientated parallel to said plane xOz perpendicular to the plates 1 and 2, since the molecules thus have a tendency to become orientated perpendicular to the field. This arrangement makes it necessary to provide orthogonal electrical fields, which for technological reasons leads to a preference for using a magnetic field for liquid crystals having negative dielectric anisotropy.

Naturally, the material contained in the cell may be formed either by a pure organic substance having the properties of a nematic liquid crystal, or by a mixture of several organic substances having the properties of nematic liquid crystals, or by a nematic liquid crystal and one other chiral organic substance. One of the essential objects of such a mixture consists of raising the flexoelectric constant.

Thus, according to a variation for carrying out the method according to the present invention, the twisting means able to twist the nematic director comprise an organic substance having the properties of a cholesteric liquid crystal.

In fact, experience has shown that by proceeding with the mixing of a nematic substance and a cholesteric substance, the latter transmits its properties to the entire nematic phase.

The helicoidal orientation of the various planes of cholesteric substances consequently gives rise to the appearance of a twisted nematic director n.

Such a means may be used for example in order to produce an initial rotation of the plane of polarization of light, the rotation then being modulated either in the direction of an increase or in the direction of a reduction, by the aforesaid means and in particular by a continuous or low frequency electrical field E.

As a variation, the twisting means may comprise exclusively cholesteric substances. In such a case, the cell may be used to produce mixtures of chiral substances by determination of the angle or rotation of the plane of polarization of light passing through the cell, which is in turn dependent on the quantity of cholesteric substance contained in the cell.

According to another variation, the twisting means may comprise in combination, cholesteric substances and means able to give preference, in different areas of the cell, to structures respectively defining nematic directors twisted in opposite directions, such a cell being able to be used for example for separating racemic compounds.

Naturally, the present invention is not limited to the embodiments which have been described, from which numerous variations may be provided without diverging from the scope of the present invention.

Thus, it is possible to produce a matrix-like control of the rotation of polarization of light passing through the cell, by providing a plurality of electrodes, able to generate the continuous or low frequency electrical field E, on the plates 1 and 2, even in the actual volume of the material.

One may also use a stabilizing field with one (or more) counter-electrodes on one of the plates and a matrix of electrodes on the other plate.

By way of example, four electrodes separated by a distance of 10 μm, the voltage to be applied between the electrodes is of the order of 1.5 V for an angle of rotation of the plane of polarization of approximately ±45°.

The cell according to the present invention may also be used for detecting or measuring a flow. In such a case, it is sufficient to adapt the cell so that the said flow constitutes the said twisting means and twists the nematic director n. It is then sufficient to examine the rotation of the plane of polarization of light induced when the light passes through the cell.

On the other hand, although the preceding description refers essentially to the case of calamitic, nematic, liquid crystals, the present invention will be easily extended to the use of discotic, nematic, liquid crystals, for which the nematic director n corresponds to the unitary vector representative of the preferred direction of alignment of the axes of the discs. Naturally, on a practical level, since the diamagnetic anisotropy of discotic, nematic, liquid crystals is negative, the orientation of the magnetic field will have to be modified as a consequence. Similarly, in this case also, the orientation of the electrical field will have to be determined as a function of the sign of the dielectric anisotropy of the material chosen.

What is claimed is:

1. An electro-optical method using liquid crystals comprising the steps of:
   filling a space between two parallel transparent plates with a material which comprises molecules having nematic properties, the structure of the molecules initially defining a substantially rectilinear nematic director perpendicular to the plates;
   conferring on said material a structure defining a second nematic director curved at least once in a plane perpendicular to the plates by application of a high frequency electrical field to the material, such that the second nematic director arrives substantially perpendicularly at at least one of the two plates;
   imparting a twist to the second nematic director along a component at right angles to said plane perpendicular to the plates to impart a twist in the second nematic director; and
   causing light arriving with an incidence substantially at right angles to one of the plates to pass through the material, a rotation of polarization of the light, at an outlet from the plates, depending on the twist imparted to the second nematic director.

2. A method according to claim 1, characterized by said material having a negative dielectric anisotropy and the high frequency electrical field being substantially perpendicular to the plates.

3. A method according to claim 1, characterized by said material having positive dielectric anisotropy and the high frequency electrical field being substantially parallel to the plates.

4. An electro-optical method using liquid crystals comprising the steps of:
   filling a space between two parallel transparent plates with a material which comprises molecules having nematic properties, the structure of the molecule initially defining a substantially rectilinear nematic director perpendicular to the plates;
   conferring on said material a structure defining a second nematic director curved at least once in a plane perpendicular to the plates by application of a magnetic field to the material, such that the second nematic director arrives substantially perpendicularly at at least one of the two plates;
   imparting a twist to the second nematic director along a component at right angles to said plane perpendicular to the plates; and
   causing light arriving with an incidence substantially at right angles to one of the plates to pass through the material, a rotation of polarization of the light, at an outlet from the plates, depending on the twist imparted to the second nematic director.

5. An electro-optical method using liquid crystals comprising the steps of:
   filling a space between two parallel transparent plates with a material which comprises molecules having nematic properties and non-vanishing flexoelectric anisotropy;
   conferring on said material a structure defining a nematic director curved at least once in a plane perpendicular to the plates such that the nematic director arrives substantially perpendicularly at at least one of the two plates;
   imparting a twist to the nematic director along a component at right angles to said plane perpendicular to the plates with application to the material of a low frequency electrical field having a component at right angles to said plane perpendicular to the plates; and
   causing light arriving with an incidence substantially at right angles to one of the plates to pass through the material, a rotation of polarization of the light, at an outlet from the plates, depending on the twist imparted to the nematic director.

6. An electro-optical method using liquid crystals comprising the steps of:
   filling a space between two parallel transparent plates with a material which comprises molecules having nematic properties and non-vanishing flexoelectric anisotropy;
   conferring on said material a structure defining a nematic director curved at least once in a plane perpendicular to the plates such that the nematic director arrives substantially perpendicularly at at least one of the two plates;

imparting a twist to the nematic director along a component at right angles to said plane perpendicular to the plates with application to the material of a continuous electrical field having a component at right angles to said plane perpendicular to the plates; and causing light arriving with an incidence substantially at right angles to one of the plates to pass through the material, a rotation of polarization of the light, at an outlet from the plate, depending on the twist imparted to the nematic director.

7. An electro-optical method using liquid crystals comprising the steps of:

filling a space between two parallel transparent plates with a material which comprises molecules having nematic properties;

conferring on said material a structure defining a nematic director curved at least once in a plane perpendicular to the plates such that the nematic director arrives substantially perpendicularly at at least one of the two plates;

imparting a twist to the nematic director along a component at right angles to said plane perpendicular to the plates with application to the material of a high frequency electrical field of orientation substantially parallel to the plates; and causing light arriving with an incidence substantially at right angles to one of the plates to pass through the material, a rotation of polarization of the light, at an outlet from the plate, depending on the twist imparted to the nematic director.

8. A method according to claim 7 characterized in that the high frequency electrical field is substantially at right angles to said plane perpendicular to the plates.

9. A method according to claim 7 characterized by the high frequency electrical field being substantially parallel to said plane perpendicular to the plates.

10. A method according to claim 8 characterized by the material having positive dielectric anisotropy.

11. A method according to claim 9 characterized by the material having negative dielectric anisotropy.

12. An electro-optical method using liquid crystals comprising the steps of:

filling a space between two parallel transparent plates with a material which comprises molecules having nematic properties;

conferring on said material a structure defining a nematic director curved at least once in a plane perpendicular to the plates such that the nematic director arrives substantially perpendicularly at at least one of the two plates;

imparting a twist to the nematic director along a component at right angles to said plane perpendicular to the plates with application to the material of a magnetic field substantially parallel to the plates; and causing light arriving with an incidence substantially at right angles to one of the plates to pass through the material, a rotation of polarization of the light, at an outlet from the plates, depending on the twist imparted to the nematic director.

13. A method according to claim 12 characterized by the material having positive dielectric anisotropy.

14. A method according to claim 12 characterized by the material having negative dielectric anisotropy.

15. An electro-optical method using liquid crystals comprising the steps of:

filling a space between two parallel transparent plates with a material which comprises molecules having nematic properties;

conferring on said material a structure defining a nematic director curved at least once in a plane perpendicular to the plates such that the nematic director arrives substantially perpendicularly at at leat one of the two plates, and applying to the material a magnetic field which is oblique with respect to the plates in order to give preference to a particular area of the structure;

imparting a twist to the nematic director along a component at right angles to said plane perpendicular to the plates; and causing light arriving with an incidence substantially at right angles to one of the plates to pass through the material, a rotation of polarization of the light, at an outlet from the plates, depending on the twist imparted to the nematic director.

16. An electro-optical method using liquid crystals comprising the steps of:

filling a space between two parallel transparent plates with a material which comprises molecules having nematic properties;

conferring on said material a structure defining a nematic director curved at least once in a plane perpendicular to the plates such that the nematic director arrives substantially perpendicularly at at least one of the two plates, and applying to the material an electrical field which is oblique with respect to the said plates in order to give preference to a particular area of structure of said material; imparting a twist to the nematic director along a component at right angles to said plane perpendicular to the plates; and causing light arriving with an incidence substantially at right angles to one of the plates to pass through the material, a rotation of polarization of the light, at an outlet from the plates, depending on the twist imparted to the nematic director.

17. An electro-optical device using liquid crystals comprising a cell which is composed of two parallel transparent plates between which is placed a material which comprises molecules having nematic properties, orientation means arranged in order to confer on said material contained between the plates, a structure defining a nematic director curved at least once in a plane perpendicular to the said transparent and parallel plates such that the nematic director arrives perpendicularly at at least one of the two plates and twisting means comprising means able to apply an electrical field parallel to the plates to cause twisting of the nematic director along a component at right angles to said plane perpendicular to the plates defined by the nematic director under the action of the orientation means.

18. A device according to claim 17 wherein the twisting means comprises means able to apply a continuous electrical field parallel to the plates and said material has non-vanishing flexoelectric anisotropy.

19. A device according to claim 17, characterized by the fact that it comprises means sensitive to the polarization of light which enters the cell and means for examining variations in the polarization of the light passing through the cell.

20. An electro-optical device using liquid crystals comprising a cell which is composed of two parallel transparent plates between which is placed a material which comprises molecules having nematic properties, orientation means arranged in order to confer on said material contained between the plates, a structure defining a nematic director curved at least once in a plane perpendicular to the transparent and parallel plates such that the nematic director arrives perpendicularly at at least one of the two plates and twisting means comprising means able to apply an electric field parallel to the plates to cause twisting of the nematic director along a component at right angles to said plane perpendicular to the plates defined by the nematic director under the action of the orientation means.

21. A device according to claim 20, characterized by the fact that it comprises means sensitive to the polarization of light which enters the cell and means for examining variations in the polarization of the light passing through the cell.

22. An electro-optical method using liquid crystals comprising the steps of:
  filling a space between two parallel transparent plates with a material which comprises molecules having nematic properties and non-vanishing flexoelectric anisotropy;
  conferring on said material a structure defining a nematic director curved at least once in a plane perpendicular to the said plates such that the nematic director arrives substantially perpendicularly at at least one of the two plates;
  imparting a twist to the nematic director along a component at right angles to said plane perpendicular to the plates with application to the material of a low frequency electrical field parallel to the plates, and with simultaneous application of a high frequency electrical field; and
  causing light arriving with an incidence substantially at right angles to one of the plates to pass through the material, a rotation of polarization of the light, at an outlet from the plates, depending on the twist imparted to the nematic director.

23. An electro-optical method using liquid crystals comprising the steps of:
  filling a space between two parallel transparent plates with a material which comprises molecules having nematic porperties and non-vanishing flexoelectric anisotropy;
  conferring on said material a structure defining a nematic director curved at least once in a plane perpendicular to the said plates such that the nematic director arrives substantially perpendicularly at at least one of the two plates;
  imparting a twist to the nematic director along a component at right angles to said plane perpendicular to the plates with application to the material of a continuous electrical field parallel to the plates, and with simultaneous application of a high frequency electrical field; and
  causing light arriving with an incidence substantially at right angles to one of the plates to pass through the material, a rotation of polarization of the light, at an outlet from the plates, depending on the twist imparted to the nematic director.

* * * * *